Nov. 8, 1960     A. M. HILL ET AL     2,958,884
VARIABLE-DIAMETER PIPE LINE SCRAPER

Filed June 13, 1957     3 Sheets-Sheet 1

INVENTORS
ARTHUR M. HILL
POSY A. HOWARD
JAMES A. FUGATE

BY

*John W. Butcher*
AGENT

Nov. 8, 1960   A. M. HILL ET AL   2,958,884
VARIABLE-DIAMETER PIPE LINE SCRAPER

Filed June 13, 1957   3 Sheets-Sheet 3

INVENTORS
ARTHUR M. HILL
POSY A. HOWARD
JAMES A. FUGATE
BY
John W. Butcher
AGENT

United States Patent Office 2,958,884
Patented Nov. 8, 1960

2,958,884

VARIABLE-DIAMETER PIPE LINE SCRAPER

Arthur M. Hill, Posy A. Howard, and James A. Fugate, Tulsa, Okla., assignors to Service Pipe Line Company, Tulsa, Okla., a corporation of Maine Filed June 13, 1957, Ser. No. 665,388

1 Claim. (Cl. 15—104.19)

This invention is directed to an apparatus for cleaning pipe lines and more particularly to an expansible scraper or brush assembly.

Many pipe line systems are constructed with different diameter pipes in series. This is particularly true of crude oil and natural gas transmission lines. The transmission systems start with a small diameter line and, as lateral feed lines increase the volume of fluid which must be handled, the diameter of the pipe is progressively increased. Pipe line scrapers and cleaners heretofore used in these systems have not been entirely satisfactory. The brushes tend to wear unevenly and are not readily adaptable to use in pipe lines of different diameters, due to the mounting devices presently used. The mounting devices do not allow the brush face to expand freely parallel to the interior wall of the pipe line. The brushes are normally independently actuated by a resilient member and thus as the scraper passes over a lateral feed line inlet at least one brush is deflected into the inlet. This anchors the scraper and requires manipulations to free it.

The object of this invention is therefore to provide a pipe line scraper which will readily expand and contract to adapt itself to different size pipes while retaining its ability to thoroughly clean the pipe. Another object of this invention is to provide a pipe line scraper which will readily pass over a lateral line inlet or opening. Another object of this invention is to provide a pipe line scraper which is particularly adapted to give full scraping coverage around the inner circumference of the pipe and compensate for scraper wear in such fashion that the elements will exert an even and positive force on the surface being scraped, even though the elements become worn and even though the scraper passes into a pipe of different diameter.

Other objects and advantages of the present invention may be seen by a reading of the following description taken in conjunction with the accompanying drawing in which.

Figure 1:
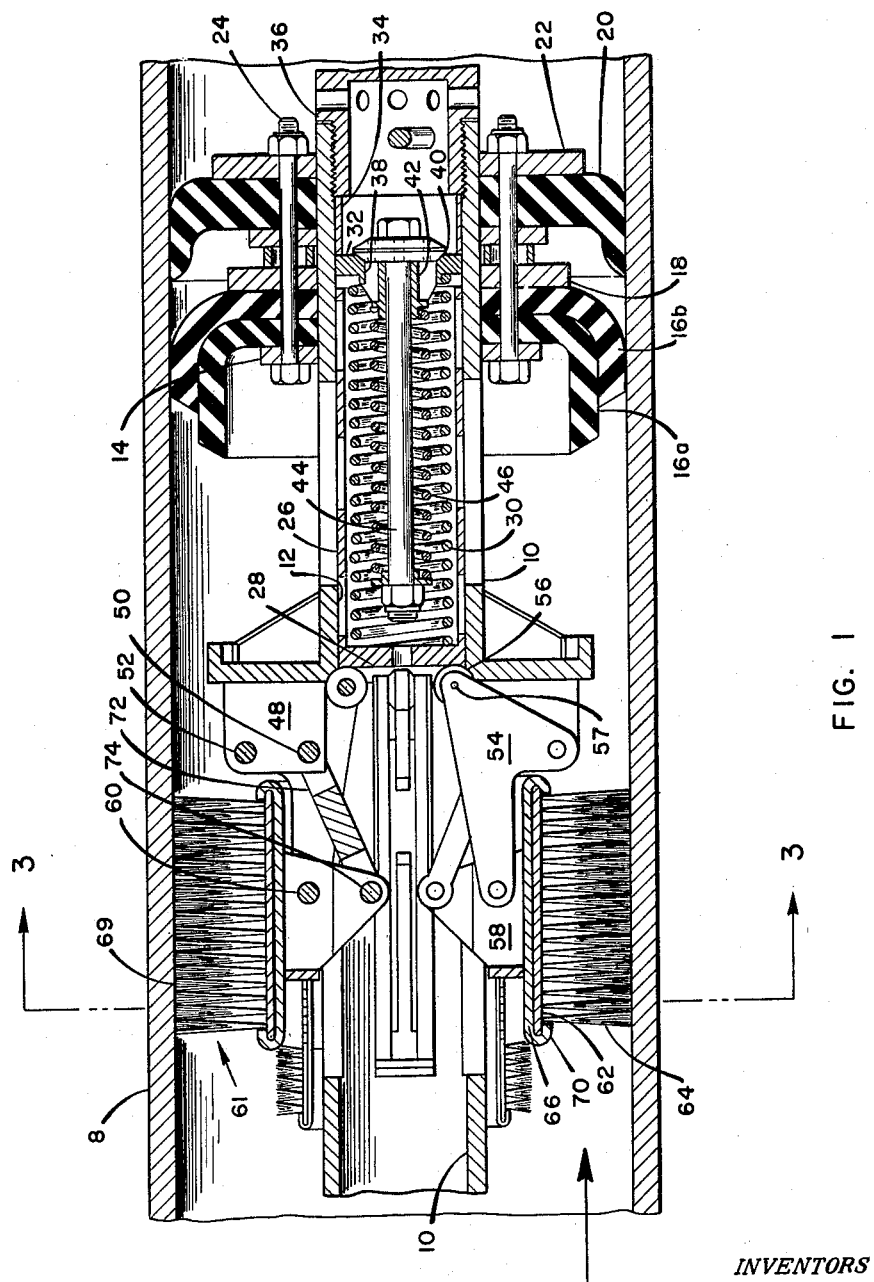
Fig. 1 is a side view, in cross section, showing the apparatus of the present invention positioned within a small tubular member.

In the illustrated embodiment of the present invention the apparatus is shown positioned within the pipe line 8. As shown, the apparatus includes a tubular body 10 which is provided with a central opening 12 therethrough. A disc 14 is connected, as by welding, near one end of the tubular body. Large diameter propellent cups 16a and 16b are mounted on the tubular body adjacent the disc 14, followed respectively by a cup spacer 18, a small diameter propellent disc 20, and a back-up plate 22. The propellent cups, cup spacer, propellent disc and back-up plate are fastened to the tubular body by means of anchor bolts 24.

A sleeve 26 is slidably mounted within the tubular body and has a partially closed cap 28 at one end. A spring 30 is positioned within the sleeve such that the free end of the spring acts against the partially closed cap 28 and the fixed end acts against a collar 32 which is adjustably positioned axially within the tubular body 10 by means of a spacer 34 and a threaded gland 36. The free end of the spring moves from an initial compressed position, as shown in Figure 1, to a final less compressed position as the brushes are fully expanded.

The collar 32 is provided with a port 38, valve seat 40, and a ported spider 42. The valve member 44 is normally held against the valve seat 40 by means of a valve spring 46. This valve operates to pass fluid as a relief valve in case the pressure differential across the unit exceeds a predetermined value.

The tubular body 10 is provided with a plurality of hinge brackets 48. Each bracket has a front parallel bar pin 50, and a brush hinge pin 52. Hinge arm 54 is pivotally mounted to the hinge bracket 48 by the brush hinge pin 52. A roller 56 is pivotally mounted to the hinge arm 54 by the roller pin 57. The roller provides a connection between hinge arm 54 and cap 28. The hinge arm 54 is pivotally connected to the brush holder 58 through the brush holder pin 60. Each of the scrapers or brush elements 61 are removable from its holder and consists of a backing 62, and bristles 64. The saddle 66, which forms a part of the brush holder 58, has rolled ends 70 which define a U-shaped channel to receive the backing 62 of the brushes.

The radial or lateral movement of the brush holder 58 and the brushes is controlled by the movement of the hinge arm and its actuating means, i.e., the spring 30. A parallel bar 72 is connected to the brush holder through the rear parallel bar pin 74 and to the hinge bracket 48 through the front parallel bar pin 50.

The brushes are axially and circumferentially arranged along and about the body of the tool and preferably are in alternate oppositely disposed pairs in at least two locations along the longitudinal axis of and about the circumference of the tool body. The brushes have a circumferential space therebetween which space is preferably less than the width of the individual brushes. Two or more units may be connected together in tandem. The brushes on the rear unit may be aligned with the circumferential spaces between the brushes on the front unit. This provides for complete coverage of the inside surface of the pipe when using the scraper in a large diameter pipe and a considerable overlap of the brushes when the scraper is used within a smaller diameter pipe. The staggered arrangement of the brushes and the single actuating means which simultaneously moves each brush the same distance from the axis of the tool, acts to center the scraper. This phenomenon is maintained even as the tool passes over a lateral line inlet providing the axial brush spacing (distance from the leading edge of the front brush to the trailing edge of the rear brush) is greater than the diameter of the lateral pipe line inlet. Thus, as one brush element passes over a lateral line inlet the actuating means does not force the brush into the lateral line but maintains the brush at the same laterally or radially displaced distance as the remaining brushes. The remaining brushes will maintain the scraper concentric with the main pipe line. This arrangement of the brush elements and the single actuating means thus greatly reduces the possibility of the scraper sticking or stalling in lateral line inlets. It also permits the use of relatively short brushes so that the scraper will pass through the short radius bends in the pipe line.

The bristles are subject to wear in traveling through a pipe line. The brush holders are expanded as the bristles wear to compensate for shortened bristle length and to maintain the same unit force on the surface of the pipe. It is important that the face 69 of the brush remain parallel to the surface of the pipe. A parallelogram-type mounting is employed in the present invention to position the brushes with respect to the surface of the pipe. This prevents the brush from tilting which would produce a high rate of wear on a small section of the brush by an increased unit force between the brush and the pipe wall. The parallelogram mounting includes the brush hinge pin 52, hinge arm 54, front parallel bar pin 50, parallel bar 72, rear parallel bar pin 74, brush holder pin 60, hinge bracket 48, and brush holder 58. The distance between the front parallel bar pin and the brush hinge pin is equal to the distance between the brush holder pin and the rear parallel bar pin. The brush hinge pin and the front parallel bar pin are preferably on a line perpendicular to the longitudinal axis of the tubular body. The brush holder pin and rear parallel bar pin are preferably on a line perpendicular to the brush face 69. The distance on the hinge arm 54 between the brush hinge pin 52 and the brush holder pin 60 is equal to the distance on the parallel bar 72 between the rear parallel bar pin 74 and the front parallel bar pin 50.

Figure 4:
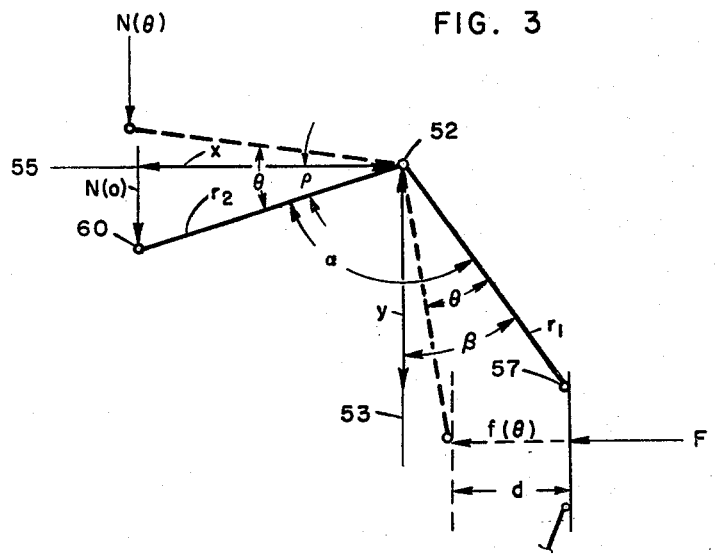
Figure 4 is a force diagram of the brush-expanding apparatus.

The brush expander includes a coil spring 30 which acts against the roller 56 on one end of an L-shaped hinge arm 54. The hinge arm which is pivoted to the hinge bracket acts as a lever of the first degree. The other end of the hinge arm is attached to the brush holder 58 which conveys the force of the spring to the brush bristles. Considering the apparatus positioned within a relatively small diameter pipe, as shown in Figure 1, the spring 30 forces the brushes against the wall of the pipe with an initial force. The brushes expand due to wear of the bristles or movement of the apparatus into a larger diameter pipe and one end of the spring moves from an initial compressed position to a final less compressed position. The force exerted on the lever arm roller 56 is diminished directly as the spring lengthens between the initial and the final position. A novel arrangement of the brush expander is provided to compensate for variations in the spring force. Briefly, this is accomplished by arranging the lever in such a manner that as the force of the spring changes, due to expansion or contraction, the lever advantage changes proportionately such that the force exerted on the pipe remains substantially constant. Figure 4 represents the mechanics of the lever arrangement. The symbols used in Figure 4 are defined as follows:

$r_1$=A first arm having a length defined as the distance from the brush hinge pin 52 to the roller pin 57, in inches.

$r_2$=A second arm having a length defined as the distance from the brush hinge pin 52 to the brush holder pin 60, in inches.

$F$=Initial force exerted by spring 30 against roller pin 57, in pounds.

$f(\theta)$=Force exerted by spring 30 against roller pins 57 at any point within the lever stroke, in pounds.

$\theta$=Rotation of hinge arm about hinge pin 52, in degrees.

$\alpha$=The angle between $r_1$ and $r_2$, in degrees.

$\beta$=The initial angle, in degrees, defined by $r_1$ and a line 53 perpendicular to the longitudinal axis of the scraper through the brush hinge pin 52.

$\rho$=The initial angle, in degrees, defined by $r_2$ and a line 55 perpendicular to line 53 at the brush hinge pin 52.

$N(o)$=The initial force exerted by the brush holder 58 against brush holder pin 60, in pounds.

$N(\theta)$=Force exerted by the brush holder 58 against brush holder pin 60 at any point within the lever stroke, in pounds.

$k$=Spring constant, in pounds per inch.

$d$=Travel of the spring, in inches.

$x$=Effective brush lever arm of $N(\theta)$ about brush hinge pin 52, in inches.

$y$=Effective spring lever arm of $f(\theta)$ about brush hinge pin 52, in inches.

$n$=Number of hinge arms.

A general equation representing the brush holder force $N(\theta)$ at any given position is derived as follows:

$$N(\theta) = \frac{r_1 \cos(\beta-\theta)}{r_2 \sin(\alpha-\beta+\theta)}\left[\frac{F - kr_1[\sin\beta - \sin(\beta-\theta)]}{n}\right]$$

It is desirable to select values which give a substantially constant brush force $N(\theta)$ throughout the angular arm rotation ($\theta$). Preferable ranges of values for $\alpha$, $\beta$, $\theta$, and $\rho$, were developed in the design of several variable-diameter scrapers. $\alpha$ should be greater than 100°, $\beta$ greater than 20° and less than 90°, $\theta$ should be less than $2\beta$, and $$\rho = \frac{\beta}{2}$$

Imposing the above limitations to the design of a scraper the following equation may be used to determine a proper spring constant.

$$k = \frac{F}{r_1}\left|\cot\alpha\right|$$

Actual design values for two variable-diameter scrapers follow:

|  | 12″–16″ scraper | 8″–12″ scraper |
|---|---|---|
| F _____ lbs__ | 118.5 | 114 |
| k _____ lbs./in__ | 8.71 | 11.6 |
| α _____ degree__ | 103 | 101.5 |
| β _____ do____ | 32.5 | 34 |
| $r_1$ _____ in__ | 3¼ | 2⅔ |
| $r_2$ _____ in__ | 3 | 2.78 |
| n _____ | 4 | 4 |

The resultant brush force $N(\theta)$ remains relatively constant throughout the hinge arm travel ($\theta$). The forces $N(\theta)$ are as follows:

12″–16″ SCRAPER

| Pipe Size | $\theta$ in degrees | $N(\theta)$ in pounds |
|---|---|---|
| 12 in_____ | 0 | 28.7 |
|  | 10 | 28.9 |
|  | 20 | 28.9 |
|  | 30 | 28.8 |
|  | 40 | 28.6 |
|  | 42.5 | 28.5 |
|  | 50 | 28.5 |
| 16 in_____ | 60 | 28.6 |
|  | 65 | 28.7 |

8″–12″ SCRAPER

| Pipe Size | $\theta$ in degrees | $N(\theta)$ in pounds |
|---|---|---|
| 8 in_____ | 0 | 19.7 |
|  | 10 | 18.8 |
|  | 20 | 18.8 |
|  | 30 | 19.7 |
|  | 34 | 19.7 |
|  | 42.5 | 19.5 |
|  | 50 | 19.5 |
| 12 in_____ | 60 | 19.5 |
|  | 68 | 19.6 |

This illustrates that in these two variable-diameter scrapers, forces $N(\theta)$ were maintained substantially even through a range substantially in excess of the normal lever movement of 0 to 42.5°. This movement may be due to bristle wear, a change in the diameter of pipe, or a combination thereof.

Figure 2:
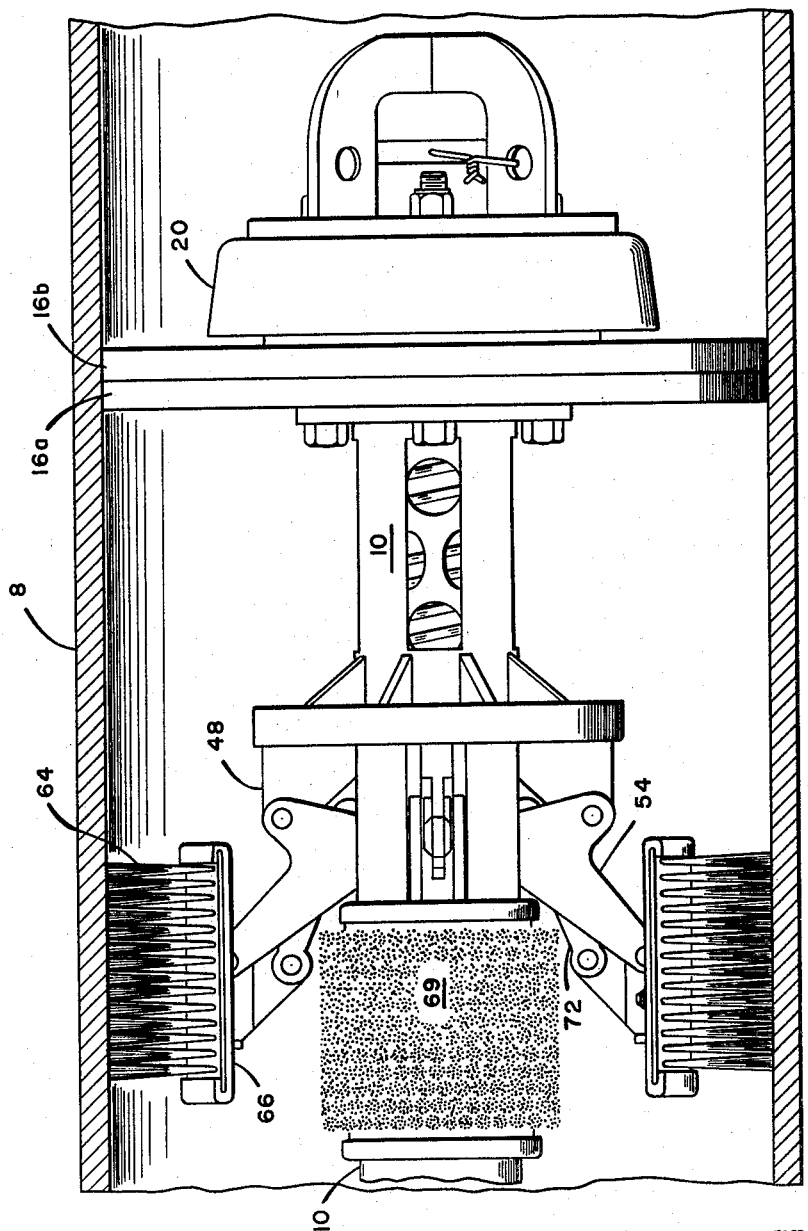
Figure 2 is a side view, partially in cross section, with the apparatus shown in Figure 1 expanded within a large tubular member.
Figure 3:
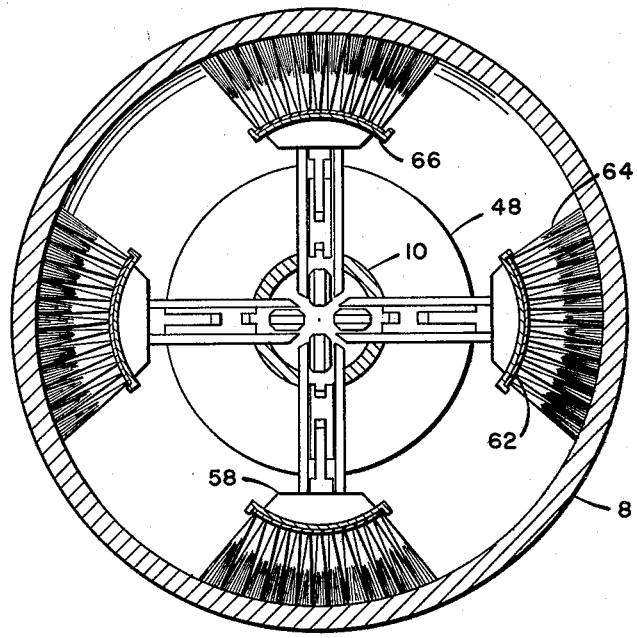
Figure 3 is an end view of the present invention taken along section lines 3—3 of Figure 1.

In operation, the device is inserted in a pipe line by using a conventional scraper trap. Fluid under pressure is admitted to the pipe line behind the scraper and acts against the propellent unit which comprises a disc or cups to force the scraper through the pipe line. The scraper is maintained concentric with the pipe by the brushes on one end and by the propellent disc or cups on the other end. Preferably two propellent units may be axially spaced on the same scraper whereby the fluid will not by-pass both propellent units at the same time. Alternately two scrapers may be used in series and may be connected by a universal joint coupling. This allows the two scrapers to traverse short radius bends in the pipe line and by utilizing two scrapers the rear scraper can push the front scraper across lateral line openings wherein fluid would normally by-pass the propellent unit of the front scraper. The front scraper will thereafter pull the rear scraper across these openings. It is preferable to use a plurality of different diameter propellent units on each scraper so that the large diameter unit will center and propel the scraper through a large diameter pipe, as shown in Figure 2, and the small diameter unit will center and propel the scraper through a small diameter pipe, as shown in Figure 1. The force of the brushes against the surface of the pipe may be adjusted by changing the length of the spacer 34 or the position of the gland 36.

Manifestly, the construction as shown and described is capable of some additional modification and such modification as may be construed to fall within the scope and meaning of the appended claim is also considered to be within the spirit and intent of the invention.

We claim:

A pipe line scraper comprising a tubular body, a plurality of brushes being arranged along the axis of said tubular body in a spaced apart relationship and being arranged about the circumference of said tubular body in a spaced apart relationship, a plurality of hinge arms each being pivotally connected to said tubular body about a hinge arm pin axis, said hinge arm pin axes being arranged in planes perpendicular to the longitudinal axis of said tubular body, each of said hinge arms having a first arm $r_1$, and a second arm $r_2$ defining an angle $\alpha$ therebetween, each of said second arms being pivotally connected to one of said brushes, each of said hinge arms being arranged to rotate about said hinge arm pin axis from a first position to a second position through an angle of rotation $\theta$, said first arm being arranged at an initial angle $\beta$ from a line through said hinge arm pin axis perpendicular to said longitudinal axis such that the moment arm of a force acting against the end of said first arm and acting parallel to said longitudinal axis continually increases as said hinge arm rotates through said angle $\beta$ and decreases as said hinge arm $r_1$ continues to rotate from $\theta$ equal to $\beta$ to $\theta$ equal to two times $\beta$, said second hinge arm $r_2$ being so arranged that the moment arm of the force acting on the brush perpendicular to the longitudinal axis increases as said hinge arm $r_2$ rotates through an angle $\rho$ from $\theta$ equal to zero to $\theta$ equal to $\rho$ and decreases as said hinge arm $r_2$ continues to rotate from $\theta$ equal to $\rho$ to $\theta$ equal to two times $\beta$, said angle $\rho$ being equal to 90 degrees plus said angle $\beta$ minus said angle $\alpha$, said angle $\theta$ being less than about two times said angle $\beta$, said angle $\alpha$ being greater than 100° and not greater than said initial angle $\beta$ plus 90°, and a spring means having an axis concentric with said longitudinal axis, said spring means having one end attached to said tubular body and another end acting against said first arm, said spring means having a spring constant $k$ derived from the formula $$k = \frac{F}{r_1}\left|\cot_\alpha\right|$$

wherein F is the initial force exerted by said spring means against said first arms $r_1$ when said spring means is in a compressed position.

References Cited in the file of this patent

UNITED STATES PATENTS

| | | |
|---|---|---|
| 2,219,555 | Burwell | Oct. 29, 1940 |
| 2,278,026 | Smith | Mar. 31, 1942 |
| 2,552,339 | Moon | May 8, 1951 |
| 2,657,506 | Hadley et al. | Nov. 3, 1953 |
| 2,791,123 | Thomsen | May 7, 1957 |
| 2,792,807 | Cumings | May 21, 1957 |
| 2,812,624 | Billeter | Nov. 12, 1957 |

FOREIGN PATENTS

| | | |
|---|---|---|
| 22,072 | Great Britain | of 1905 |
| 273,808 | Germany | May 8, 1914 |
| 750,592 | Great Britain | June 20, 1956 |